(12) United States Patent
Bertz et al.

(10) Patent No.: US 8,571,551 B1
(45) Date of Patent: Oct. 29, 2013

(54) CONTROLLING WIRELESS DEVICE REGISTRATION BASED ON VEHICLE MOVEMENT

(75) Inventors: Lyle T. Bertz, Lee's Summit, MO (US); David N. Alberico, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 195 days.

(21) Appl. No.: 13/172,180

(22) Filed: Jun. 29, 2011

(51) Int. Cl.
*H04W 4/00* (2009.01)

(52) U.S. Cl.
USPC ........................................................... 455/435.1

(58) Field of Classification Search
USPC ..................................................... 455/435.1
See application file for complete search history.

(56) References Cited

U.S. PATENT DOCUMENTS

| 7,047,005 | B2 | 5/2006 | Kinnavy |
| 7,369,849 | B2 | 5/2008 | Fraser et al. |
| 2002/0154036 | A1 | 10/2002 | Flick |
| 2003/0109268 | A1* | 6/2003 | Fraser et al. ................... 455/466 |
| 2003/0232619 | A1* | 12/2003 | Fraser ............................ 455/420 |
| 2004/0142659 | A1* | 7/2004 | Oesterling .................... 455/11.1 |
| 2004/0203340 | A1* | 10/2004 | Oesterling ........................ 455/9 |
| 2004/0203767 | A1* | 10/2004 | Fraser et al. ................ 455/435.1 |
| 2005/0143146 | A1* | 6/2005 | Kim .............................. 455/574 |
| 2007/0078571 | A1* | 4/2007 | Heffington ......................... 701/1 |
| 2012/0028680 | A1* | 2/2012 | Breed ......................... 455/556.1 |

OTHER PUBLICATIONS

U.S. Appl. No. 12/914,998, filed Oct. 28, 2010.

* cited by examiner

*Primary Examiner* — Nathan Mitchell

(57) ABSTRACT

A wireless communication device integrated with a vehicle operates in a reduced-registration mode while the vehicle ignition is off. In the reduced-registration mode, the wireless communication device periodically determines, based at least on vehicle control system data such as odometer data or wheel-rotation data, whether the vehicle has moved at least a threshold extent, and if so the wireless communication device engages in air interface registration. The arrangement helps to conserve vehicle battery power while the ignition is off, while keeping a serving radio access network apprised when the vehicle has been moved sufficiently, so that the network can more readily route messages such as telematics commands to the vehicle.

20 Claims, 3 Drawing Sheets

CONTROLLING WIRELESS DEVICE REGISTRATION BASED ON VEHICLE MOVEMENT

BACKGROUND

In normal practice, when a cellular wireless communication device is in an idle state, the device may periodically engage in air interface registration with a serving radio access network. This periodic registration helps the network keep track of where the wireless device is located (e.g., in which cell sector of the network), so that the network can appropriately route page messages, text messages, control messages and the like to the wireless device.

OVERVIEW

One problem with this periodic registration function is that it tends to consume limited battery power. Consequently, if a device is running on battery power and is left in the idle state for a sufficiently long period of time, its periodic registration may be a significant factor in the device ultimately running out of battery power.

While such loss of battery power may be inconvenient for a user of a portable wireless communication device (such as a handheld cell phone or wirelessly-equipped computer for instance), the user can easily resolve the problem by simply connecting the wireless device to a charging port to charge the battery.

A more significant problem can arise, however, in a scenario where the wireless communication device is integrated with a vehicle, such as to facilitate wireless communications to and from the vehicle. A practical example of such an arrangement is where a wireless communication device is integrated with a vehicle control system to facilitate telematics functions such as wirelessly receiving and responding to commands unlock the vehicle doors (e.g., where a user has locked his or her keys in the vehicle), to cut off the vehicle's ignition (e.g., where the car is reported stolen and should be disabled), or to report the vehicle's location. Further, such an integrated wireless communication device may also provide the driver and passengers of the vehicle with telephone and data communication service, such as the ability to place and receive phone calls through a sound-system of the vehicle, and the ability to access Internet content for instance.

In general, such an integrated wireless communication device will be powered by the vehicle. For instance, when the vehicle's ignition is on, the wireless device may receive power from the vehicle's alternator or may receive power from the vehicle's battery, which may be continuously charged by the alternator. When the vehicle's ignition is off, however, the battery may continue to supply power to the wireless device so that the device can continue to operate in a telematics mode (e.g., to receive and respond to door-unlock commands, ignition-cutoff commands, location-reporting commands, etc.) or carry out other wireless device functions.

A wireless device that is integrated with a vehicle may be arranged to enter a quiescent state when the vehicle's ignition turns off, in an effort to conserve the vehicle's battery power. In the quiescent state, the wireless device may engage in very little processing or other functionality so that the device would consume very little battery power. To facilitate receiving telematics commands while the vehicle ignition is off, however, the wireless device may periodically wake up according to a watchdog timer and register with the network and scan for any pertinent messages, and the device may then return to its quiescent state.

A problem with such arrangement is that if the vehicle's ignition is off for an extended period of time and the wireless device continues to engage in this periodic registration, the wireless device may ultimately exhaust the vehicle's battery power. This may happen, for instance, if the vehicle is parked in a garage at an airport while the vehicle owner is away on a long trip, for instance. In that scenario, when the owner returns from the trip the owner may find that the vehicle's battery has died, and the owner may be unable to start the vehicle. Further, if the owner has inadvertently locked his or her keys in the vehicle, the owner may be unable to have a remote door-unlock command be received and processed by the vehicle.

One solution to this problem is to arrange the wireless device to not re-register with the network while the vehicle ignition is off. If the wireless device remains registered with the network (e.g., does not de-register) when the vehicle ignition turns off and does not re-register with the network over time while the vehicle ignition is off, less battery power should be consumed, and the vehicle battery may survive an extended period of the vehicle being parked. Further, re-registration while the vehicle ignition is off may in theory be unnecessary, since the vehicle would not be driven with the ignition off and would therefore remain in the same location to the knowledge of the network. Thus, inhibiting device re-registration while the vehicle ignition is off is one way to help conserve the vehicle's battery power.

A problem with this solution, however, is that the vehicle may in fact be moved even though its ignition is off. For instance, the vehicle may be towed due to illegal parking or by a thief, or the vehicle may be moved by environmental forces such as high winds or water flow. In these or other situations, the vehicle owner may want the vehicle to be able to receive and respond to telematics commands, such as location-reporting, ignition-cutoff, or door-unlock commands for instance. However, if the vehicle has been moved sufficiently far and the wireless device has not re-registered with the network, the network may be unable to route a telematics command to the wireless device.

As a specific example, if the vehicle has been towed to a remote location, the owner may want to invoke a telematics command to cause the vehicle to report its location so the owner can find the vehicle. However, if the wireless device has not re-registered with the network and the network therefore does not have data indicating the coverage area (or paging area) in which the vehicle is located, the network may have difficulty sending that command to the vehicle. And as another example, if the vehicle has been stolen and moved far away, the owner may wish to invoke a telematics command to cause the vehicle to disable its ignition so that it cannot be started. However, again, if the network does not know where the vehicle is located, the network may have difficulty sending that command to the vehicle as well.

Disclosed herein is an arrangement to help overcome this problem. As disclosed, while the ignition of the vehicle is off, the integrated wireless communication device will operate in a reduced-registration mode in which the device periodically determines from at least vehicle control system data whether the vehicle has moved a threshold extent and the device then responsively registers with the network only if the determination is that the vehicle has moved at least the threshold extent. Further, each time the device makes this determination, the device may also scan the airwaves for any messages destined to the device.

With the benefit of this arrangement, the device can avoid engaging in, or can greatly reduce the extent to which it engages in, air interface registration while being powered by the vehicle's battery. Advantageously, however, the device will also keep the network apprised of its location when the device has moved sufficiently. The arrangement may thereby help conserve the vehicle's battery power while retaining the ability of the device to receive and respond to telematics commands or to engage in other useful wireless communication functions.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to illustrate the invention by way of example only.

DETAILED DESCRIPTION

Figure 1:
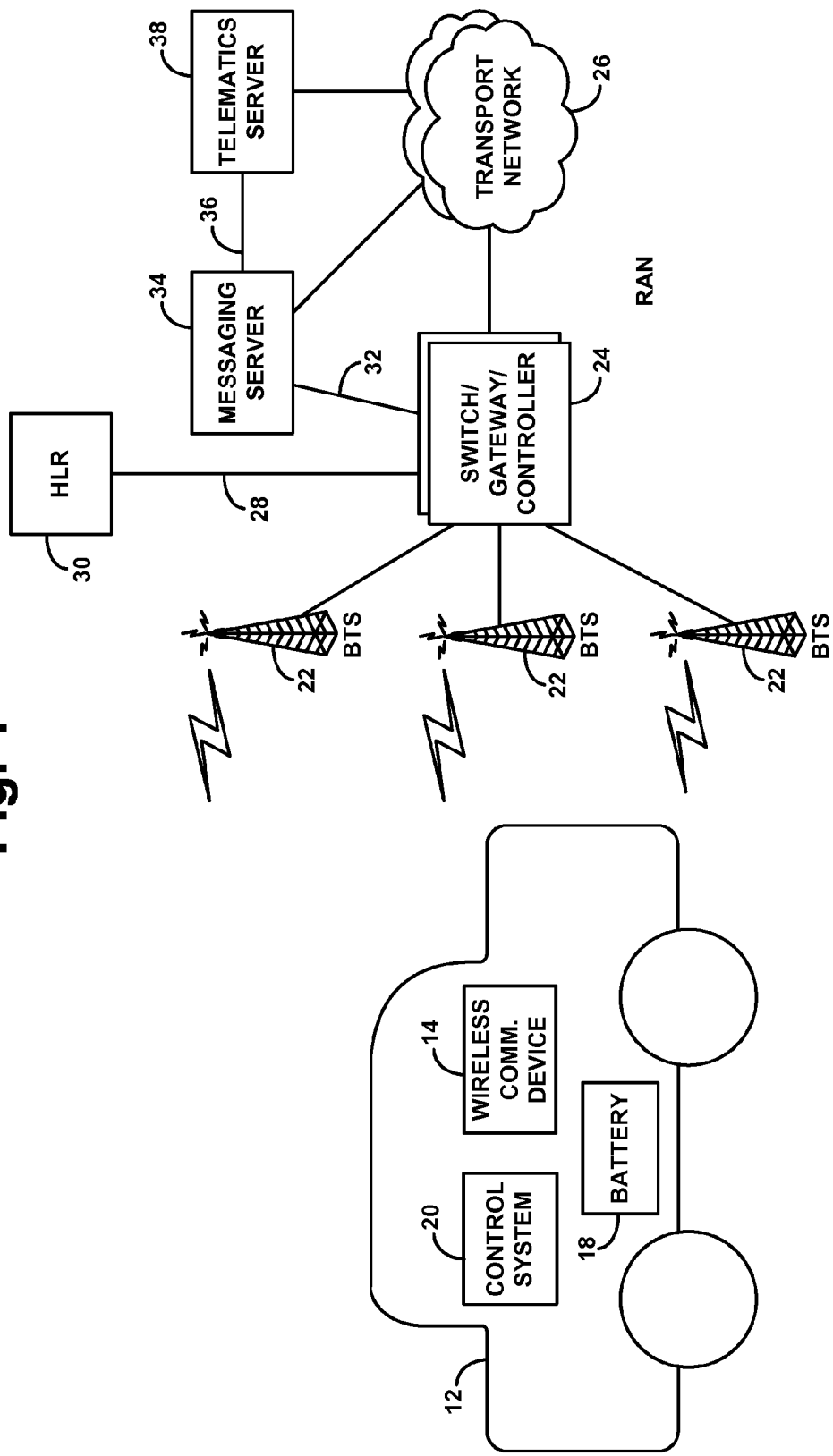
FIG. 1 is a simplified diagram of a system in which the exemplary wireless communication device integrated with a vehicle may be implemented.

As noted above, FIG. 1 is a simplified diagram of a system in which a representative arrangement can be implemented. Generally, the figure depicts a vehicle 12 having an integrated wireless communication device 14 that is arranged to communicate with a radio access network 16.

Vehicle 12 is shown by way of example as a car. In practice, however, the vehicle could take numerous other forms, including but not limited to a van, a truck, a boat, a motorcycle, an airplane, or any other vehicle now known or later developed. Preferably, the vehicle is motorized and includes a battery 18 that provides power to the vehicle and, at least at times, to the wireless communication device 14. However, there may be useful embodiments of the present disclosure where the vehicle is not motorized or where power is provided to the vehicle and/or the wireless communication device in some other manner.

Wireless communication device 14 generally provides wireless communication service for the vehicle, to facilitate telematics and other communication functions such as those described above for instance. As such, the wireless device 14 may be communicatively linked with, or provided as part of, a control system 20 of the vehicle, including but not limited to an industry standard on-board diagnostics (OBD) system for instance, and the wireless device may include a wireless communication module that facilitates air interface communication with the radio access network. Further, the wireless device may include or implement logic to carry out the innovative functions described herein. In practice, the wireless device may be manufactured as an integral part of the vehicle. Alternatively, the wireless device may be added on to the vehicle by a dealer or other vendor.

Radio access network (RAN) 16 comprises any network or other system arranged to engage in air interface communication with wireless communication devices such as device 14, preferably throughout a wide geographic area. By way of example, RAN 16 may comprise a cellular wireless communication network operated by a wireless carrier. As shown, such a network may include a number of base transceiver stations (BTSs) 22, each providing antennas that radiate to define one or more wireless coverage areas, such as cell sectors or broader coverage areas (e.g., clusters of cell sectors), in which wireless communication devices can communicate with the RAN according to one or more agreed air interface protocols, such as CDMA (e.g., 1xRTT or 1xEV-DO), iDEN, WiMAX, LTE, GSM, HSDPA, or others now known or later developed. The RAN may then further include one or more switches, gateways, controllers, or the like 24, that provide connectivity with one or more transport networks 26.

The RAN may broadcast certain control signals respectively in each coverage area, for receipt by wireless devices operating in the coverage area. For instance, in each coverage area, the RAN may broadcast a pilot signal and/or other control signal that provides or embodies (e.g., is encoded with) an identifier of the coverage area. In CDMA systems, for instance, the RAN may broadcast in each cell sector a pilot signal that embodies a pseudo-noise offset (PN offset) uniquely identifying the cell sector as compared with adjacent cell sectors. Further, the RAN may broadcast other potentially more unique identifiers of coverage areas, as well as other control information.

Further, the RAN may define in each coverage area one or more paging channels on which the RAN may broadcast page messages destined for particular wireless devices. In practice, the RAN may transmit such messages in particular timeslots on a paging channel, and the wireless device may be arranged to read the paging channel at those timeslots, in search of any relevant page messages.

The RAN may use the paging channel or other designated air interface channel or channels to provide various control signals or bearer data to the wireless device. For example, if the RAN seeks to set up a call to a wireless device, the RAN may broadcast a page message for receipt by the wireless device to alert the device of the call, and the device may receive and respond to the page message to facilitate assignment of an air interface traffic channel over which to conduct the call. And as another example, if the RAN has a short messaging service message, short data burst message, or other type of message to send to the wireless device, the RAN may similarly deliver the message to the wireless device via a paging channel or other designated air interface channel.

Shown coupled with the RAN 16 through one or more signaling links 28 is a home location register (HLR) 30, which maintains a profile record for each served wireless device indicating the wireless serving area (e.g., cell, cell sector, or switch serving area) where the wireless device has most recently registered for service with the RAN.

In practice, as noted above, a wireless device may be set to register with the network periodically and/or in response to other trigger events. To register, the wireless device may wirelessly transmit a registration message via an air interface access channel to the RAN. Upon receipt of such a registration message from the wireless device via a particular wireless coverage area, the RAN may then transmit a registration notification message to the HLR 30, and the HLR may update its profile record for the wireless device to indicate the device's current serving area.

Also shown coupled with the RAN, through signaling links 32 and/or via transport network(s) 26, is a representative messaging server 34, such as a short messaging service center for instance, which functions to transmit messages to particular wireless devices. In practice, when messaging server 34 receives a message to send to a particular wireless device, such as device 14 for instance, the server 34 may query HLR 30 to determine the serving area where the wireless device most recently registered, and the server may then transmit the message to a switch or other entity serving that area, so that the message can then be routed to the wireless device.

Shown coupled with the messaging server 34 through signaling link 36 and/or via transport network(s) 26 is then a telematics server 38. Telematics server 38 may function to engage in telematics communication via RAN 16 with wireless devices such as device 14, so as to convey telematics commands as described above for instance. For example, if an owner of vehicle 12 has locked his or her keys in the car, the owner may contact telematics server 38 (e.g., a provider of server 38) to request that a door-unlock command be sent to the vehicle, and telematics server 38 may then responsively transmit a door-unlock command to wireless device 14 for processing by the vehicle control system 20. In particular, telematics server 38 may output the message addressed to the wireless device, and the message may be routed to messaging server 34 and routed in turn via RAN 16 to the wireless device.

Figure 2:
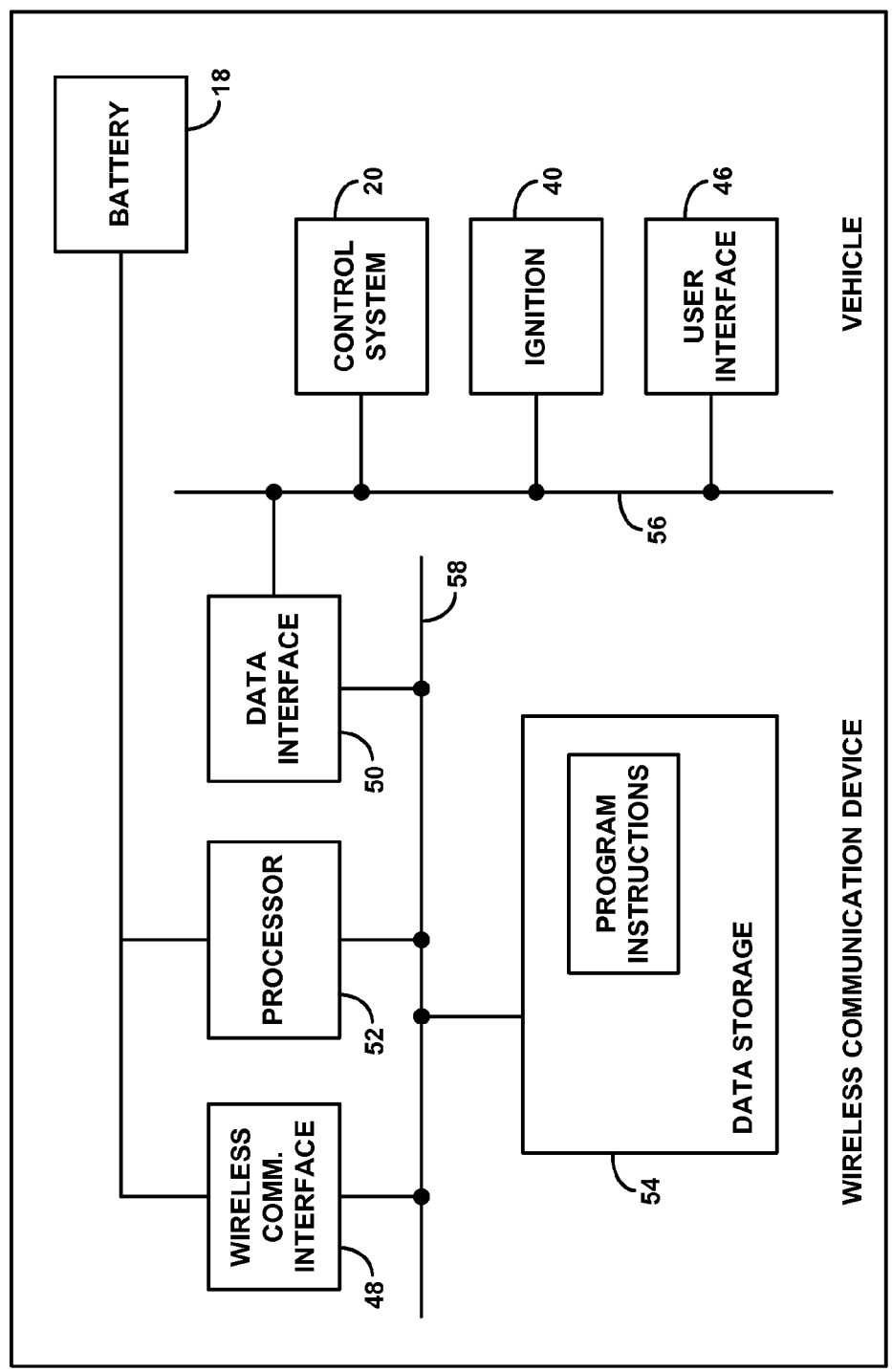
FIG. 2 is simplified block diagram of a wireless communication device integrated with a vehicle.

FIG. 2 is next a functional block diagram of wireless device 14 integrated with vehicle 12 in accordance with a representative arrangement. The block diagram depicts on the right side components that may be considered part of the vehicle 12 and on the left side components that may be considered part of the wireless device 14. It will be understood, however, that variations from the arrangement shown are possible. For instance, one or more of the components shown as part of the vehicle may be part of the wireless device, and one or more of the components shown as part of the wireless device may be part of the vehicle. Further, one or more components may be components of both the wireless device and the vehicle. Numerous other arrangement are possible as well. Therefore, the specific arrangement shown should not be taken as limiting.

As illustrated in FIG. 2, in the representative arrangement, the vehicle 12 includes an ignition 40, battery 18, control system 20, and a user interface 46, and the wireless device 14 includes a wireless communication interface 48, a data interface 50, a processor 52, and data storage 54. Ignition 40, control system 44, user interface 46, and data interface 50 are shown coupled with a system bus, network, or other connection mechanism 56. Further, wireless communication interface 48, data interface 50, processor 52, and data storage 54 are shown coupled with another system bus, network, or connection mechanism 58. And battery 18 is shown coupled with at least wireless communication interface 48 and processor 52.

Ignition 40 functions generally to turn on or off an engine of the vehicle. The ignition may take any form now known or later developed, such as an electronic ignition for instance. In operation, when the ignition is on, the engine (e.g., internal combustion engine and/or electric motor) may be supplying power to drive the vehicle, while an alternator or other mechanism may be supplying power to charge battery 18, and the alternator, battery, or some other power source may be supplying power to components such as the wireless device 14. On the other hand, as noted above, when the ignition is off, battery 18 may continue to supply power to components such as wireless device 14, to allow continued for telematics control and other functionality.

Battery 18 may comprise any battery of a type now known or later developed. By way of example, battery 18 may be a lead-acid automotive battery. Alternatively, the battery may be designed more specifically for powering components such as wireless device 14.

Control system 20 preferably stores and reports vehicle status information regarding vehicle systems, such as ignition status, odometer status (distance traveled reading), wheel rotation data (e.g., extent of wheel rotation), etc. The control system, which as noted above may include an industry standard OBD system, may communicate over bus 56, receiving queries for the status of particular vehicle systems and responding with the requested information. The control system may further publish certain status information, so that entities in communication with bus 56 can determine the current status of various systems. For instance, the control system may publish ignition state information, indicating in binary (e.g., Boolean) format whether the vehicle ignition is currently on or off. Such information may be usefully employed by wireless device 14 in accordance with the present disclosure, to trigger operation in a reduced-registration mode when the vehicle ignition is off.

User interface 46 may comprise input and output components to facilitate interaction with a user, such as a driver or passenger of the vehicle for instance. As such, user interface 46 may be integrated in a dash and other user-accessible portions of the vehicle. By way of example, user interface 46 may include a touch-sensitive display screen for presenting information to a user and receiving input from a user. As another example, user interface 46 may be integrated with a vehicle sound system, including a microphone and speakers, or may provide its own audio interface, to allow audio interaction with a user. Other examples are possible as well.

Wireless communication interface 48 may comprise a mobile station modem or other transceiver arranged to engage in air interface communication with RAN 16 according to one or more agreed air interface protocols, such as any of those noted above for instance. To facilitate this, the interface 48 may further include or be interconnected with one or more antennas (perhaps on the exterior of the vehicle) and may include logic to carry out functions such as engaging in air interface registration with the RAN and so forth. In practice, the wireless communication interface 48, or more generally the wireless communication device 14, may subscribe to service with a wireless carrier that operates RAN 16, with subscription and service fees being paid by the vehicle owner or by another party.

Data interface 50 may comprise a proprietary or standard connection mechanism (e.g., pin-out port) through which the wireless device connects with the vehicle, so as to communicate with the vehicle control system, to receive vehicle status information and to provide telematics commands such as those discussed above for instance.

Processor 52 may comprise one or more general purposes processors (e.g., INTEL processors) and/or one or more special purposes processors (e.g., digital signal processors or application specific integrated circuits). Further, the processor 52 may be integrated in whole or in part with the wireless communication interface 48. For instance, the wireless communication interface may be arranged to control periodic registration and may further be arranged to manage operation in the reduced-registration mode in accordance with the present disclosure.

Data storage 54, in turn, may comprise one or more volatile and/or non-volatile storage components, such as magnetic, optical, or solid-state (e.g., EEPROM or flash) memory for instance and may be integrated in whole or in part with processor 52. As shown, data storage 54 may hold program instructions executable by processor 52 to carry out various functions described herein, such as to cause wireless device 14 to operate in a quiescent mode, to wake up periodically in accordance with a watchdog timer and to then determine, based on at least vehicle control data, whether the vehicle has moved more than a threshold extent since the processor last checked, and, if so, to trigger air interface registration.

Figure 3:
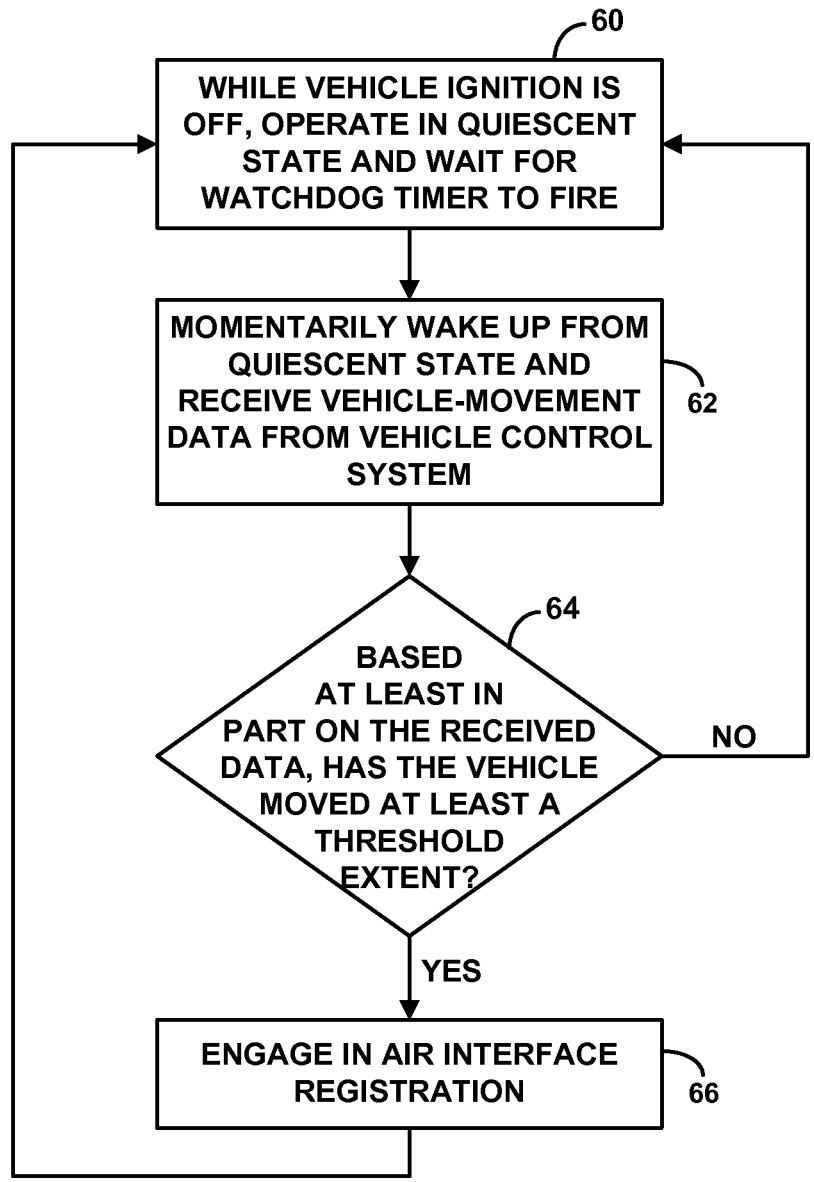
FIG. 3 is a flow chart depicting functions that can be carried out by a wireless device integrated with a vehicle.

FIG. 3 is next a flow chart depicting functions that can be carried out by a wireless device integrated with a vehicle as presently contemplated. Wireless device 14 may carry out the functions of FIG. 3 in response to the ignition 40 of vehicle 12 being turned off and while the ignition is off, which wireless device 14 may determine from ignition-state data provided by control system 20. The wireless device 14 may likewise carry out the functions of FIG. 3 at other times as well. However, carrying out the indicated functions is believed to be particularly advantageous when the vehicle ignition is off, in an effort to help conserve power of battery 18.

As shown in FIG. 3, at block 60, the wireless device operates in a quiescent state in which the device does not automatically engage in periodic air interface registration with the RAN, and the wireless device applies a watchdog timer to facilitate periodic performance of the subsequent steps. The watchdog timer is preferably set to trigger the subsequent steps at an interval that is sufficiently long to help conserve battery power. (As such, the wireless device or other entity could be arranged to automatically extend the interval of the watchdog timer in response to detecting that the remaining power of battery 18 has dropped to below a defined threshold level, so as to further help conserve battery power.) Each time the watchdog timer fires, an interrupt or other process causes the wireless device to then proceed to block 62.

At block 62, the wireless device momentarily wakes from its quiescent state and receives vehicle-movement data from the vehicle. The wireless device may receive the vehicle movement data from control system 20 via bus 56 or in some other manner from the control system 20.

In an example embodiment, the vehicle-movement data may be odometer data and/or wheel-rotation data, both of which may provide a fairly accurate indication of whether the vehicle has been moved since a last reading for instance. This data may be established in a known manner by one or more sensors in the vehicle, such as magnetic sensors for reading full or partial wheel rotations, and the sensor readings may be stored by the control system 20, such as an OBD system. In practice, many vehicles today are arranged to record odometer changes even when the vehicle ignition is off. Further, vehicles may also record wheel-rotation data when the vehicle ignition is off, or may do so upon power being supplied to a wheel-rotation sensor. Power could be supplied to the wheel-rotation sensor in the same manner that power can be supplied to lights and/or a siren by a master alarm system, in response to door-handle-movement or accelerometer sensor detection, or in some other manner.

Through a query to the control system 20, the wireless device may thus determine an extent to which the vehicle has moved, at least in terms of wheel movement, from a last reading. Other vehicle control data for indicating vehicle movement, including wheel movement and/or lateral or other movement, from sensors now known or later developed, may be used in addition or instead. Optimally, this determination of the extent to which the vehicle has moved may be made without consideration of global positioning system data, to avoid the need to receive and process such data.

At block 64, the wireless device makes a determination, based at least on the received vehicle-movement data, of whether the vehicle has moved at least a threshold extent. The threshold extent for this purpose can be defined by the wireless device manufacturer and/or by a user or technician through user-interface 46, or in some other manner. Further, making the determination of whether the vehicle has moved more than a threshold extent may involve reading data that indicates an extent of movement since a last reading by the wireless device and/or comparing data indicating location as of a last reading with location as of a new reading, to determine distance travelled, or may take some other form. Distance, for this purpose, may be measured in traditional units such as inches, feet, miles, or kilometers, or the like, and/or may be measured in other units, such as number of wireless coverage areas traversed.

In practice, the wireless device may be arranged to use vehicle control system data (e.g., odometer and/or wheel-rotation data) alone as a basis to make the determination of whether the vehicle has moved the threshold extent at block 64. For instance, the wireless device may query the control system 20 to determine a current odometer reading and may compute a difference between that reading and an odometer reading recorded by the wireless device at the time the ignition turned off or at a time of latest registration. The wireless device may then determine whether that difference is at least the threshold extent.

Alternatively, the determination of whether the vehicle has moved at least the threshold extent could be a two (or more) part determination. For instance, the wireless device may first make a determination from the vehicle control system data (e.g., odometer data and/or wheel-rotation data) that the vehicle has moved at least a first threshold extent, which may be a relatively short distance such as mere inches or feet. In response to making that first determination, the wireless device may then make a second determination based on wireless network data of whether the vehicle has traversed a threshold number of wireless coverage areas or simply whether the vehicle has moved into a new coverage area.

To facilitate making this second determination, the wireless device may record the broadcast identity of one or more wireless coverage areas in which the device is located at the time the vehicle ignition turns off or at the time of the device's last registration. To make the second determination, the device may then determine the broadcast identity of one or more wireless coverage areas in which the device is currently located and may compare the determined wireless coverage area identity or identities with the recorded identity or identities. The device may thereby determine whether the vehicle has traversed a threshold number of wireless coverage areas (e.g., moved into a new coverage area, or traversed some other number of coverage areas), as the determination of whether the device, and thus the vehicle, has moved at least the threshold extent.

Further or alternatively, if the device has access to wireless coverage area mapping data, the device may use the coverage area identifiers and the mapping data as a basis to determine how far the device travelled since the ignition was turned off or since the device's last registration with the network. The device may then determine if that distance is at least the threshold extent.

If the determination at block 64 is that the vehicle has not moved at least the threshold extent, then the wireless device does not proceed to block 66. Instead, the wireless device may return to block 60, operating in the quiescent state and waiting for the watchdog timer to fire again.

On the other hand, if the determination at block 64 is that the vehicle has moved at least the threshold extent, then the wireless device proceeds to block 66. At block 66, the wireless device then engages in air interface registration with the RAN 16. For instance, the processor 52 may cause the wireless communication interface 48 to transmit a registration message via an air interface access channel to the RAN as described above. Furthermore, the wireless device may then scan an air interface paging channel, at a next scheduled timeslot for instance, in search of any messages that the RAN is transmitting to the wireless device and, upon receipt of any such messages, may process the messages. The wireless device may then return to block 60, operating in a quiescent state and waiting for the watchdog timer to fire again.

In normal practice, when the vehicle ignition is on, the wireless device may periodically engage in air interface registration without regard to movement of the vehicle. With the benefit of the present process, however, when the vehicle ignition is off, the wireless device may avoid periodically engaging in air interface registration, or may engage in air interface registration less often than the wireless device does while the vehicle ignition is on, thus helping to conserve vehicle battery power.

Further, to avoid having the wireless device receive and process relatively low-priority messages (e.g., non-telematics messages) while the vehicle ignition is off, the wireless device may arrange for low-priority messages to be held while the ignition is off.

For instance, when the wireless device detects that the vehicle ignition turns off, the wireless device may re-register with the RAN (e.g., may de-register and then re-register, or may simply re-register with the RAN), and as part of the re-registration process may signal to the RAN to cause low-priority messages to be held. By way of example, the wireless device may include in its registration message a special parameter that the RAN will interpret to mean that low-priority messages destined to the wireless device should be held. The RAN may then signal to the messaging server 34 to cause the messaging server to hold such messages. Alternatively, the wireless device may send a control signal directly to the RAN or messaging server to request holding of such messages. Until further notice, the messaging server may then hold low-priority messages for the mobile station, but may still route to the mobile station any other messages, such as particular telematics messages for instance.

When the wireless device then detects that the vehicle ignition turns back on, the wireless device may then re-register with the RAN again and provide a signal to request any previously-held messages to be sent to the wireless device.

An exemplary embodiment has been described above. It should be understood, however, that variations from the embodiment discussed are possible, while remaining within the true spirit and scope of the invention as claimed.

We claim:

1. A wireless communication device integrated with a vehicle,
    the wireless communication device being arranged to operate in a first state while an ignition of the vehicle is off, wherein, in the first state while the ignition of the vehicle is off, the wireless communication device carries out functions comprising:
    (i) receiving vehicle-movement data from the vehicle,
    (ii) making a determination, based at least on the received vehicle-movement data, of whether the vehicle has moved at least a threshold extent, and
    (iii) only if the determination is that the vehicle has moved at least the threshold extent, then responsively engaging in air interface registration with a serving radio access network.

2. The wireless communication device of claim 1, wherein the vehicle-movement data comprises at least one of wheel-rotation data and odometer data.

3. The wireless communication device of claim 2, wherein, in at least the first state, the wireless communication device is powered by a battery of the vehicle.

4. The wireless communication device of claim 2, wherein, in the first state, the wireless communication device carries out the functions periodically in accordance with a watchdog timer.

5. The wireless communication device of claim 2, wherein the wireless communication device is further arranged to operate in a second state when the ignition of the vehicle is on, wherein, in the second state, the wireless communication device periodically engages in air interface registration without regard to movement of the vehicle.

6. The wireless communication device of claim 5, wherein in the first state, the wireless communication device does not periodically engage in air interface registration.

7. The wireless communication device of claim 5, wherein in the first state, the wireless communication device engages in air interface registration less often than the wireless communication device engages in air interface registration in the second state.

8. The wireless communication device of claim 5, wherein the wireless communication device transitions from the second state to the first state when the ignition of the vehicle transitions from an on state to an off state.

9. The wireless communication device of claim 2, comprising a wireless communication interface for engaging in air interface communication, wherein the registration occurs via the wireless communication interface.

10. The wireless communication device of claim 2, wherein the functions also include scanning for any incoming messages to the wireless communication device.

11. The wireless communication device of claim 2, wherein the wireless communication device is arranged to transition from the second state to the first state in response to the ignition of the vehicle being turned off, and wherein the wireless communication device is arranged to engage in air interface registration in connection with the transition and, as part of the air interface registration in connection the transition, to request that low-priority messages for the wireless communication device be held.

12. The wireless communication device of claim 2, wherein the wireless communication device is communicatively linked with an on-board diagnostics system of the vehicle and receives the data from the on-board diagnostics system.

13. The wireless communication device of claim 2, wherein the wireless communication device makes the determination of whether the vehicle has moved at least the threshold extent without the wireless communication device referencing global satellite positioning data.

14. The wireless communication device of claim 1, comprising a wireless communication interface for engaging in air interface communication, wherein the registration occurs via the wireless communication interface, and wherein making the determination of whether the vehicle has moved at least the threshold extent further comprises:
    making a first determination, based on the data, of whether there has been threshold movement of the vehicle; and
    responsive to the first determination being that there has been threshold movement of the vehicle, evaluating broadcast data received by the wireless communication interface to make a second determination of whether the wireless communication device has traversed at least a threshold number of wireless coverage areas and, if so, concluding that the vehicle has moved at least the threshold extent.

15. The wireless communication device of claim 1, wherein engaging in air interface registration with the serving radio access network comprises transmitting via an air interface access channel to the serving radio access network a registration message that serves to register the wireless communication device as operating in a particular coverage area of the radio access network.

16. A wireless communication device integrated with a vehicle, the vehicle having an ignition and a control system, the wireless communication device comprising:
- a transceiver for engaging in air interface communication with a serving radio network;
- a data interface for communicating with the control system; and
- a processing unit arranged to cause the wireless communication device to operate in a reduced-registration mode while the vehicle ignition is off, wherein, in the reduced-registration mode, the processing unit carries out functions comprising (i) receiving vehicle-movement data from the control system via the data interface, (ii) using the received data as a basis to make a determination of whether the vehicle has moved at least a threshold extent, (iii) causing the transceiver to engage in air interface registration with the radio network in response to the determination, if the determination is that the vehicle has moved at least the threshold extent, and (iv) not causing the transceiver to engage in air interface registration with the radio network in response to the determination, if the determination is that the vehicle has not moved at least the threshold extent.

17. The wireless communication device of claim 16, wherein the vehicle-movement data comprises at least one of wheel-rotation data and odometer data.

18. The wireless communication device of claim 16, wherein the functions further comprise causing the transceiver to scan for any messages destined to the wireless communication device.

19. The wireless communication device of claim 16, wherein the processing unit transitions the wireless communication device to the reduced-registration mode in response to detecting transition of the vehicle from an ignition-on state to an ignition-off state.

20. The wireless communication device of claim 19, wherein upon transitioning to the reduced-registration mode, the wireless communication device transmits a message to the radio network to request holding of low-priority messages destined to the wireless communication device.

* * * * *